UNITED STATES PATENT OFFICE.

HANS BIEHN, OF BUDAPEST, AUSTRIA-HUNGARY, ASSIGNOR TO PYRISO-LITH ISOLATING MATERIAL MANUFACTURING COMPANY, LIMITED, OF BUDAPEST, AUSTRIA-HUNGARY.

METHOD OF PRODUCING ELECTRIC INSULATING BODIES.

SPECIFICATION forming part of Letters Patent No. 724,079, dated March 31, 1903.

Application filed April 29, 1902. Serial No. 105,200. (No specimens.)

*To all whom it may concern:*

Be it known that I, HANS BIEHN, manufacturer, a subject of the Emperor of Austria-Hungary, residing at Budapest, Austria-Hungary, have invented new and useful Improvements in Methods of Producing Electric Insulating Bodies, of which the following is a specification.

The present invention relates to a method for producing electric insulating bodies of brittle pulverized insulating material and a fusible bituminous substance, which bodies are adapted to be used for various purposes and are characterized by their superior insulating quality and capability of withstanding external influences.

The essential features of the method are as follows: The brittle material, which in itself is a good insulating agent, has to offer proper resistance to external influences, for which purpose lime, gypsum, magnesite, porcelain-clay, quartz, mica, glass, and the like are, for instance, used. The natural or artificial bituminous substance should be solid at ordinary temperature and commence to melt only at 37° to 50° centigrade, those products known as "bitumen épuré" or "goudron" being particularly suitable. One of the brittle insulating materials referred to above or a mixture of several such materials is finely pulverized and heated to a temperature of 70° to 100° centigrade. For the purpose of maintaining the temperature the heating takes place in double-walled receptacles, preferably revoluble closed cylinders, which are heated by means of hot water, steam, or air passed between the double walls in a manner adapted to be easily regulated. On the powder being brought to the desired temperature the fusible bituminous substance or a mixture of such substances is added, preferably in proportions of eighty-nine to ninty-three parts of powder and eleven to seven parts of bitumen, all taken by weight, the mass at the same time being stirred and the temperature maintained. When the mass has been thoroughly mixed, a dry and loose powder is formed, even at the aforesaid temperature, said powder containing very few lumps, which, however, can be easily ground to powder. The powder-like material thus obtained can be directly used in the manufacture of insulating bodies; but it is preferable to leave it to cool and then after the lumps contained therein have been ground to heat it in the closed receptacles described above, according to its condition, to a temperature of 140° to 180° centigrade before being molded, at the same time care being taken to prevent as far as possible the escape of the gases produced in the heating. The mass is then brought into suitable molds, according to the insulating bodies to be produced, and compressed under high pressure to about half their volume. It is preferable that the objects removed from the molds should be allowed to cool slowly. For producing the mass natural bituminous substances may also be used, which contain the necessary ingredients and in which the proportions can be suitably changed, if necessary, by a corresponding addition of lime or the like or bitumen. The bituminous substances are finely ground and further treated according to the method described above—that is to say, heated to a temperature of 140° to 180° centigrade and compressed in molds. In order to increase the solidity, the mass can be vulcanized in the known manner, after the mixing of the ingredients has taken place, by means of an addition of sulfur up to one per cent.

According to the method described above any insulating bodies—for instance, cup-insulators, insulating-tubes, supports for incandescent-lamp holders, cable-boxes, or the like—can be made which were hitherto made of porcelain, micanite, ambroin, enameled iron, or the like. Larger objects may be suitably painted, as described.

What I claim as my invention, and desire to secure by Letters Patent, is—

1. A method for producing electric insulating bodies of pulverized brittle insulating material and a fusible bituminous substance said pulverized brittle insulating material being heated to a temperature of 70° to 100° centigrade, whereupon while maintaining the said temperature and continually stirring the mass the bituminous substance is added and the whole, after complete mixing, heated to a temperature of 140° to 180° centigrade and compressed to about half its volume in suitable molds, substantially as specified.

2. A method for producing electric insulating bodies of pulverized lime and bitumen épuré, said pulverized lime being heated to a temperature of 70° to 100° centigrade, whereupon while maintaining the said temperature and continually stirring the mass the bitumen épuré is added and the whole, after complete mixing, heated to a temperature of 140° to 180° centigrade and compressed to about half its volume in suitable molds, sustantially as specified.

3. A method for producing electric insulating bodies of pulverized brittle insulating material and a fusible bituminous substance, eleven to seven parts by weight of said pulverized brittle insulating material being heated to a temperature of 70° to 100° centigrade, whereupon while maintaining the said temperature and continually stirring the mass eighty-nine to ninety-three parts by weight of bituminous substance are added and the whole, after complete mixing, heated to a temperature of 140° to 180° centigrade and compressed to about half its volume in suitable molds, substantially as specified.

4. A method for producing electric insulating bodies of pulverized brittle insulating material and a fusible bituminous substance said pulverized brittle insulating material being heated to a temperature of 70° to 100° centigrade, whereupon while maintaining the said temperature and continually stirring the mass the bituminous substance is added and the whole after complete mixing is left to cool and the lumps that may be contained therein ground to powder, said mass being then heated to a temperature of 140° to 180° centigrade and compressed to about half its volume in suitable molds, substantially as and for the purpose specified.

In witness whereof I have hereunto set my hand in presence of two witnesses.

HANS BIEHN.

Witnesses:
 MICHAEL ROWÉ,
 EUGEN HARSANY.